US010746172B2

(12) United States Patent
Yamaguchi

(10) Patent No.: US 10,746,172 B2
(45) Date of Patent: Aug. 18, 2020

(54) DRIVE DEVICE

(71) Applicant: Nidec Corporation, Kyoto (JP)

(72) Inventor: Yasuo Yamaguchi, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 6 days.

(21) Appl. No.: 16/323,638

(22) PCT Filed: Aug. 8, 2017

(86) PCT No.: PCT/JP2017/028691
§ 371 (c)(1),
(2) Date: Feb. 6, 2019

(87) PCT Pub. No.: WO2018/030373
PCT Pub. Date: Feb. 15, 2018

(65) Prior Publication Data
US 2019/0181723 A1 Jun. 13, 2019

Related U.S. Application Data

(60) Provisional application No. 62/372,411, filed on Aug. 9, 2016, provisional application No. 62/402,027, filed (Continued)

(30) Foreign Application Priority Data

Mar. 31, 2017 (JP) ................. 2017-071397

(51) Int. Cl.
H02K 7/00 (2006.01)
H02K 9/19 (2006.01)
(Continued)

(52) U.S. Cl.
CPC ............ F04C 2/10 (2013.01); F04C 2/102 (2013.01); F04C 2/103 (2013.01); F04C 13/002 (2013.01);
(Continued)

(58) Field of Classification Search
CPC ............ H02K 7/14; H02K 9/04; H02K 7/20
(Continued)

(56) References Cited

U.S. PATENT DOCUMENTS 6,039,551 A 3/2000 Takeuchi et al.
6,116,877 A 9/2000 Takeuchi et al.
(Continued)

FOREIGN PATENT DOCUMENTS

CN 102472271 A 5/2012
CN 105114302 A 12/2015
(Continued)

OTHER PUBLICATIONS

Yamaguchi et al., "Drive Device", U.S. Appl. No. 16/323,643, filed Feb. 6, 2019.
(Continued)

Primary Examiner — Jose A Gonzalez Quinones
(74) Attorney, Agent, or Firm — Keating & Bennett

(57) ABSTRACT

In a drive device, a pump includes a pump room in a housing, a suction port through which oil is to be sucked into the pump room, and a discharge port through which the oil is to be discharged from the pump room. The housing includes an inner lid that holds a bearing journaling a motor shaft and covers one side in an axial direction of a stator, an outer lid that is attached to one side in the axial direction of the inner lid and covers one side in the axial direction of the motor shaft, and a suction oil passage connecting a lower region in a vertical direction in an accommodation portion and the suction port. At least a portion of the suction oil passage is between the inner lid and the outer lid. The inner lid includes an opening penetrating the inner lid and connecting the lower region in the vertical direction and a portion of the suction oil passage between the inner lid and the outer lid. The strainer is provided in the opening.

6 Claims, 5 Drawing Sheets

Related U.S. Application Data on Sep. 30, 2016, provisional application No. 62/439,201, filed on Dec. 27, 2016.

(51) Int. Cl.

| | | |
|---|---|---|
| *H02K 7/14* | (2006.01) | |
| *F16N 1/00* | (2006.01) | |
| *F16N 7/40* | (2006.01) | |
| *F16N 13/20* | (2006.01) | |
| *F04C 2/10* | (2006.01) | |
| *F04C 15/00* | (2006.01) | |
| *F04C 13/00* | (2006.01) | |
| *F04C 15/06* | (2006.01) | |
| *H02K 5/20* | (2006.01) | |
| *F16K 17/04* | (2006.01) | |
| *H02K 9/193* | (2006.01) | |
| *H02K 11/225* | (2016.01) | |
| *H02K 1/12* | (2006.01) | |
| *H02K 1/22* | (2006.01) | |

(52) U.S. Cl.
CPC ........ *F04C 13/005* (2013.01); *F04C 15/0088* (2013.01); *F04C 15/0096* (2013.01); *F04C 15/06* (2013.01); *F16K 17/04* (2013.01); *F16K 17/0406* (2013.01); *F16N 1/00* (2013.01); *F16N 7/40* (2013.01); *F16N 13/20* (2013.01); *H02K 5/20* (2013.01); *H02K 7/003* (2013.01); *H02K 7/14* (2013.01); *H02K 9/19* (2013.01); *H02K 9/193* (2013.01); *H02K 11/225* (2016.01); *F04C 2210/14* (2013.01); *F04C 2280/02* (2013.01); *F16N 2210/18* (2013.01); *F16N 2280/00* (2013.01); *H02K 1/12* (2013.01); *H02K 1/22* (2013.01)

(58) Field of Classification Search
USPC ..................................... 310/54, 57, 75 R, 98
See application file for complete search history.

(56) References Cited

U.S. PATENT DOCUMENTS

| | | | |
|---|---|---|---|
| 6,227,828 B1 | 5/2001 | Takeuchi et al. | |
| 7,211,913 B2 | 5/2007 | Tsutsui et al. | |
| 7,828,095 B2 | 11/2010 | Murata et al. | |
| 9,441,628 B2 | 9/2016 | Sakata et al. | |
| 9,762,106 B2 | 9/2017 | Gauthier et al. | |
| 2004/0200350 A1 | 10/2004 | Makino et al. | |
| 2007/0178292 A1 | 8/2007 | Hasegawa et al. | |
| 2012/0128513 A1 | 5/2012 | Sakata et al. | |
| 2012/0220379 A1* | 8/2012 | Murakami | H02K 1/32 464/7 |
| 2013/0145879 A1 | 6/2013 | Nakamura et al. | |
| 2014/0077631 A1* | 3/2014 | Watanabe | H02K 9/19 310/54 |
| 2015/0180313 A1* | 6/2015 | Hayashi | H02K 1/32 310/54 |
| 2016/0153546 A1 | 6/2016 | Ogawa et al. | |
| 2016/0248303 A1* | 8/2016 | Kiyokami | H02K 1/2706 |
| 2017/0133912 A1* | 5/2017 | Gi | H02K 7/003 |
| 2017/0227006 A1 | 8/2017 | Lewis et al. | |

FOREIGN PATENT DOCUMENTS

| | | |
|---|---|---|
| JP | 62-29487 U | 2/1987 |
| JP | 2010-004603 A | 1/2010 |
| JP | 2010-252521 A | 11/2010 |
| JP | 2011-004487 A | 1/2011 |
| JP | 2013-055728 A | 3/2013 |
| JP | 2016-101042 A | 5/2016 |
| JP | 2016-181954 A | 10/2016 |
| JP | 2017-063542 A | 3/2017 |
| WO | 2016/033015 A1 | 3/2016 |

OTHER PUBLICATIONS

Migita et al., "Drive Device", U.S. Appl. No. 16/323,632, filed Feb. 6, 2019.
Yamaguchi et al., "Drive Apparatus", U.S. Appl. No. 16/323,633, filed Feb. 6, 2019.
Yamaguchi et al., "Drive Apparatus", U.S. Appl. No. 16/323,636, filed Feb. 6, 2019.
Yamaguchi, "Drive Device", U.S. Appl. No. 16/323,640, filed Feb. 6, 2019.
Yamaguchi, "Drive Device", U.S. Appl. No. 16/323,641, filed Feb. 6, 2019.
Official Communication issued in International Patent Application No. PCT/JP2017/028691, dated Nov. 28, 2017.

\* cited by examiner

DRIVE DEVICE

BACKGROUND OF THE INVENTION

1. Field of the Invention

The present disclosure relates to a drive device.

2. Description of the Related Art

There is known a rotary electric machine including a case in which a lubricating fluid for lubrication and cooling of a stator, a rotor, and the like is stored.

In some cases, a pump that sucks up oil stored in the case is provided in the rotary electric machine. The oil is sucked up by the pump to supply the oil to the rotor and the stator, which allows the rotor and the stator to be cooled. At this point, sometimes the foreign matter such as abrasion powders is mixed in the oil stored in the case. In this case, sometimes the foreign matter invades into the pump to lock the pump.

SUMMARY OF THE INVENTION

According to an example embodiment of the present disclosure, a drive device includes a rotor including a motor shaft disposed along a center axis extending in one direction and a rotor core fixed to the motor shaft; a stator radially opposed the rotor with a gap interposed therebetween; a housing including an accommodation portion to store oil and accommodate the rotor and the stator; a pump driven through the motor shaft; and a strainer attached to the housing. The pump unit includes a pump room provided in the housing; a suction port through which the oil is to be sucked into the pump room; and a discharge port through which the oil is to be discharged from the pump room, the housing includes an inner lid that holds a bearing journaling the motor shaft and covers one side in an axial direction of the stator; an outer lid that is attached to one side in the axial direction of the inner lid and covers one side in the axial direction of the motor shaft; and a suction oil passage connecting a lower region in a vertical direction in the accommodation portion and the suction port, the inner lid and the outer lid are a separate structures, at least a portion of the suction oil passage is disposed between the inner lid and the outer lid, the inner lid includes an opening penetrating the inner lid, the opening connects the lower region in the vertical direction in the accommodation portion and a portion disposed between the inner lid and the outer lid in the suction oil passage, and the strainer is provided in the opening.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A Z-axis direction illustrated in each drawing is a vertical direction Z in which a positive side is set to an upper side while a negative side is set to a lower side. In the embodiment, the vertical direction Z is an up-and-down direction in FIG. 1. In the following description, the vertically upper side is simply referred to as an "upper side", and the vertically lower side is simply referred to as a "lower side".

Figure 1:
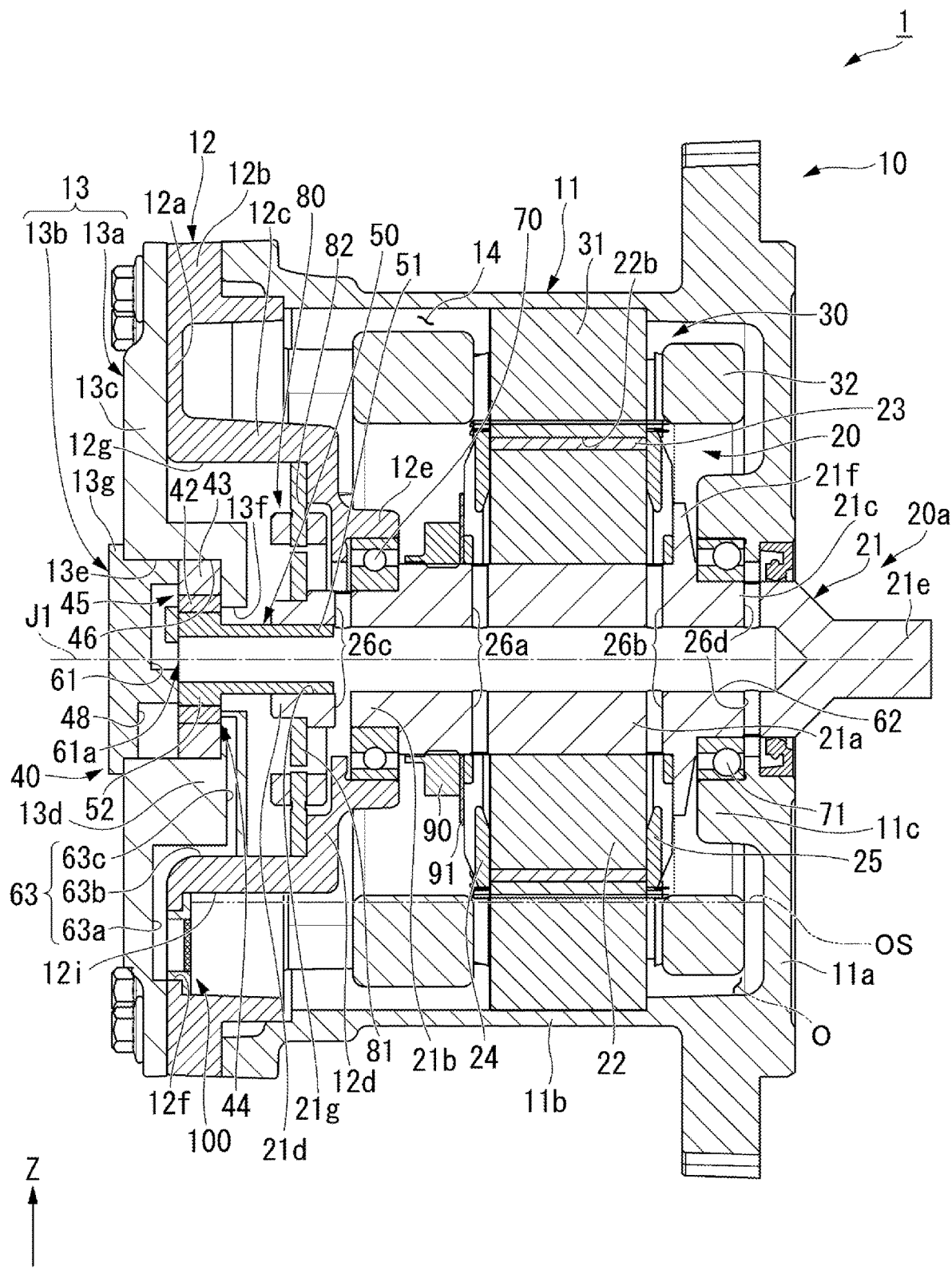
FIG. 1 is a sectional view illustrating a drive apparatus according to an example embodiment of the present disclosure.

As illustrated in FIG. 1, a drive device 1 of the embodiment includes a housing 10, a strainer 100, a rotor 20 including a motor shaft 20a disposed along a center axis J1 extending in one direction, a rotation detector 80, a stator 30, a pump 40, and bearings 70, 71.

The center axis J1 extends in a lateral direction of FIG. 1. That is, in the embodiment, the lateral direction in FIG. 1 corresponds to one direction. In the following description, a direction parallel to the center axis J1 is simply referred to as an "axial direction", a radial direction centered on the center axis J1 is simply referred to as a "radial direction", and a circumferential direction centered on the center axis J1 is simply referred to as a "circumferential direction". In the axial direction, a left side in FIG. 1 is referred to as "one side in the axial direction", and a right side in FIG. 1 in the axial direction is referred to as "the other side in the axial direction".

The housing 10 includes a main body 11, an inner lid 12, and an outer lid 13. In the embodiment, the main body 11, the inner lid 12, and the outer lid 13 are a separate member. The main body 11 has a bottomed tubular shape that is open on one side in the axial direction.

The main body 11 includes a bottom unit 11a, a main body tube 11b, and a bearing holder 11c. The bottom unit 11a has an annular plate shape expanding in the radial direction. The main body tube 11b has a cylindrical shape extending from a radially outer edge of the bottom unit 11a toward one side in the axial direction. The bearing holder 11c has a cylindrical shape protruding from an inner edge of the bottom unit 11a toward one side in the axial direction. The bearing holder 11c holds the bearing 71 in an inner circumferential surface of the bearing holder 11c.

The inner lid 12 is attached to one side in the axial direction of the main body 11. The inner lid 12 includes an annular plate 12a, an outer tube 12b, an inner tube 12c, an inner tube bottom unit 12d, and a bearing holder 12e. The annular plate 12a has an annular plate shape expanding in the radial direction. The annular plate 12a covers one side in the axial direction of the stator 30. That is, the inner lid 12 covers one side in the axial direction of the stator 30.

The outer tube 12b has a cylindrical shape extending from a radially outer edge of the annular plate 12a toward the other side in the axial direction. An end on the other side in the axial direction of the outer tube 12b is fixed while contacting with an end on one side in the axial direction of the main body tube 11b. The inner tube 12c has a cylindrical shape extending from a radially inner edge of the annular plate 12a toward the other side in the axial direction.

A first recess 12*i* recessed from the other side in the axial direction toward one side in the axial direction is provided in the inner lid 12 by the annular plate 12*a*, the outer tube 12*b*, and the inner tube 12*c*. That is, the inner lid 12 includes the first recess 12*i*. The first recess 12*i* has an annular shape centered on the center axis J1. An inside surface of the first recess 12*i* includes a radially outside surface of the inner tube 12*c*, a radially inside surface of the outer tube 12*b*, and a surface on the other side in the axial direction of the annular plate 12*a*. A bottom surface of the first recess 12*i* is a surface on the other side in the axial direction of the annular plate 12*a*.

The inner tube bottom unit 12*d* has an annular shape expanding radially inward from the end on the other side in the axial direction of the inner tube 12*c*. A second recess 12*g* recessed from the surface on one side in the axial direction of the inner lid 12 toward the other side in the axial direction is provided in the inner lid 12 by the inner tube 12*c* and the inner tube bottom unit 12*d*. That is, the inner lid 12 includes the second recess 12*g*. In the embodiment, the surface on one side in the axial direction of the inner lid 12 is the surface on one side in the axial direction of the annular plate 12*a*. The inside surface of the second recess 12*g* includes a radially inside surface of the inner tube 12*c* and a surface on one side in the axial direction of the inner tube bottom unit 12*d*.

The bearing holder 12*e* has a cylindrical shape projecting from a surface on the other side in the axial direction of the inner tube bottom unit 12*d* toward the other side in the axial direction. The bearing holder 12*e* holds the bearing 70 in the inner circumferential surface of the bearing holder 12*e*. That is, the inner lid 12 holds the bearing 70.

The accommodation unit 14 surrounded by the main body 11 and the inner lid 12 is formed by fixing the main body 11 and the inner lid 12 to each other. That is, the housing 10 includes the accommodation unit 14. The accommodation unit 14 can store oil O while accommodating the rotor 20 and the stator 30. The oil O is stored in a lower region in the vertical direction of the accommodation unit 14. As used herein, "the lower region in the vertical direction in the accommodation unit" includes a portion located below a center in the vertical direction Z in the accommodation unit.

In the embodiment, a liquid level OS of the oil O stored in the accommodation unit 14 is located above the opening 12*f*. Consequently, the opening 12*f* is exposed to the oil O stored in the accommodation unit 14. The liquid level OS of the oil O fluctuates by sucking up the oil O using the pump 40, but is disposed below the rotor 20 at least when the rotor 20 rotates. Consequently, when the rotor 20 rotates, the oil O can be prevented from becoming rotational resistance of the rotor 20.

Figure 2:
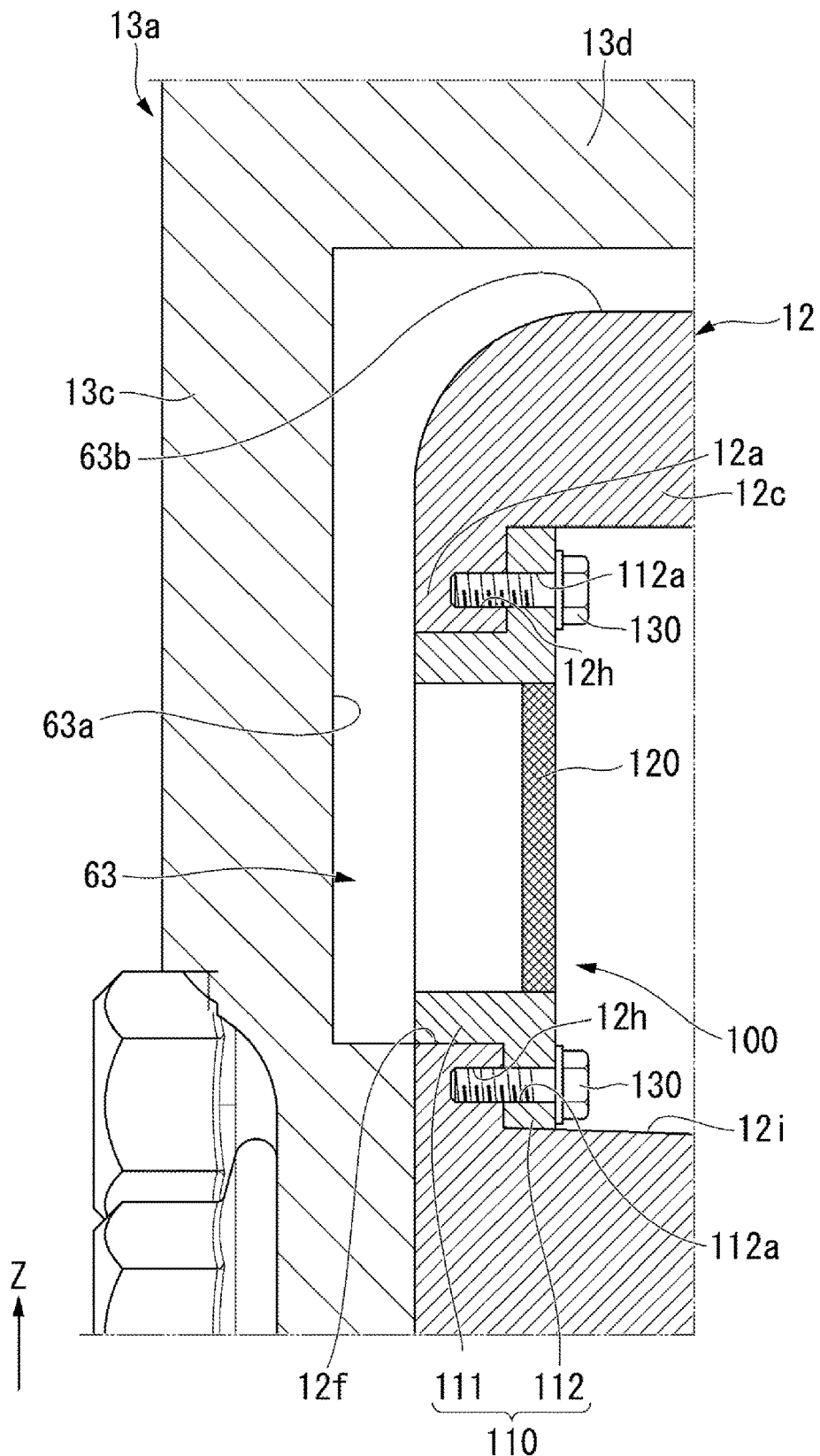
FIG. 2 is a diagram illustrating a pump portion according to an example embodiment of the present disclosure when viewed from a second axial side.
Figure 3:
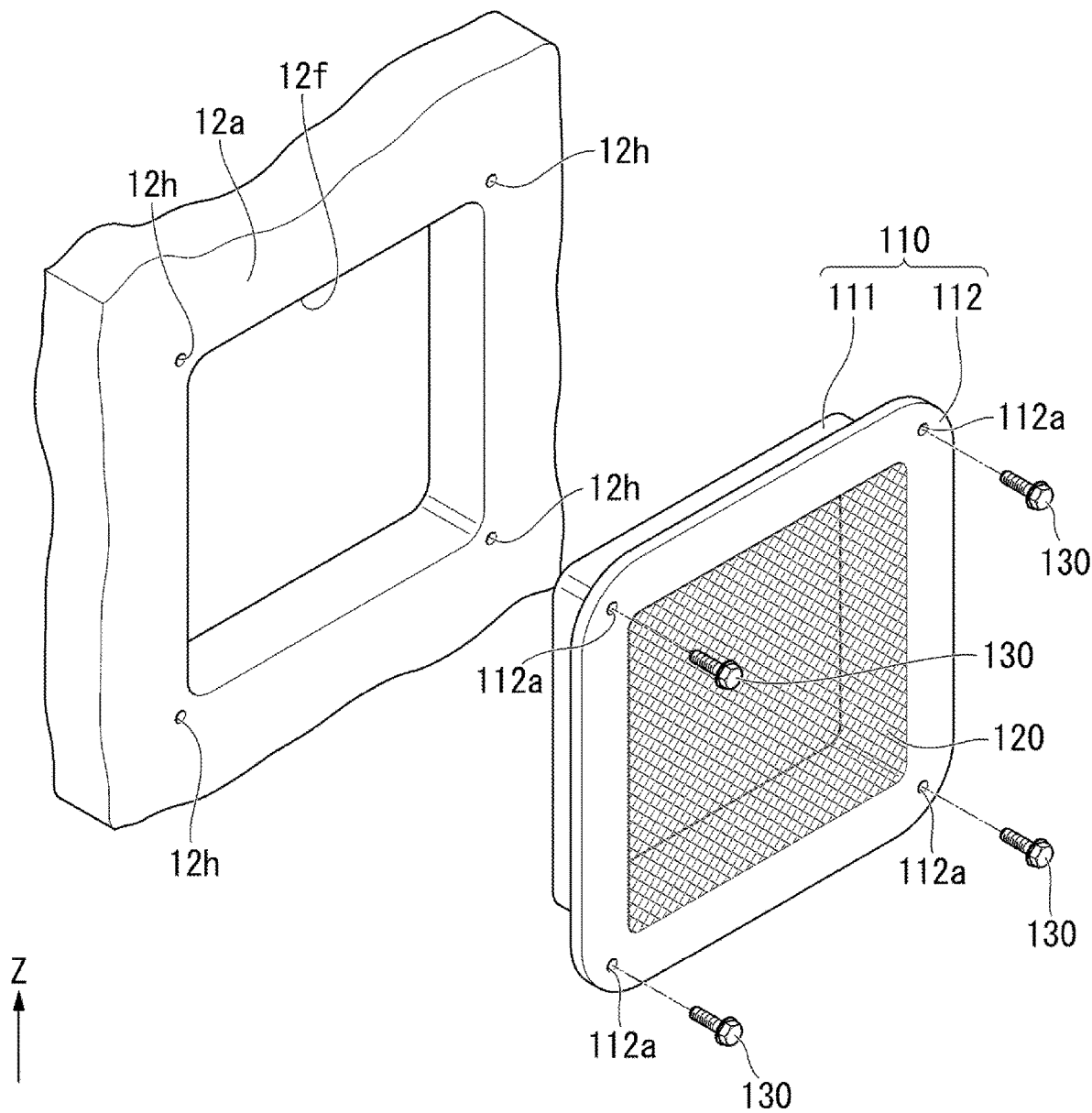
FIG. 3 is a sectional view illustrating a portion of the drive apparatus according to an example embodiment of the present disclosure.

As illustrated in FIGS. 1 and 2, the inner lid 12 includes an opening 12*f* penetrating the inner lid 12. In the embodiment, the opening 12*f* axially penetrates the inner lid 12. The opening 12*f* is provided in the bottom surface of the first recess 12*i*, namely, the surface on the other side in the axial direction of the annular plate 12*a*. The opening 12*f* axially penetrates a lower end of the annular plate 12*a*. As illustrated in FIG. 3, for example, the opening 12*f* has a substantially rectangular shape. The opening 12*f* is open to a lower region in the vertical direction in the accommodation unit 14.

The outer lid 13 is attached to one side in the axial direction of the inner lid 12. The outer lid 13 includes an outer lid body 13*a* and a plug body 13*b*. The outer lid body 13*a* expands in the radial direction. The outer lid body 13*a* has a lid plate 13*c* and a protrusion 13*d*. The lid plate 13*c* has a disc shape expanding in the radial direction. A radially outer edge of the lid plate 13*c* is fixed to a radially outer edge of the annular plate 12*a*. The surface on the other side in the axial direction of the lid plate 13*c* contacts with the surface on one side in the axial direction of the annular plate 12*a*. The protrusion 13*d* protrudes from a central portion of the lid plate 13*c* toward the other side in the axial direction. The protrusion 13*d* is inserted into the inner tube 12*c* from one side in the axial direction. The protrusion 13*d* is disposed at an interval on one side in the axial direction of the inner tube bottom unit 12*d*.

The outer lid body 13*a* includes a third recess 13*e* and a second through-hole 13*f*. The third recess 13*e* is recessed from the surface on one side in the axial direction of the outer lid body 13*a* toward the other side in the axial direction. The third recess 13*e* is provided in the central portion of the outer lid body 13*a*, and is provided over the lid plate 13*c* and the protrusion 13*d*. The second through-hole 13*f* penetrates from the bottom surface of the third recess 13*e* to the surface on the other side in the axial direction of the protrusion 13*d*. That is, the second through-hole 13*f* penetrates from the bottom surface of the third recess 13*e* to the inside of the housing 10. The second through-hole 13*f* is open to the inside of the second recess 12*g*. Consequently, the second through-hole 13*f* connects the inside of the third recess 13*e* and the inside of the second recess 12*g*. The center axis J1 passes through the second through-hole 13*f*.

The plug body 13*b* is fixed to the outer lid body 13*a* while fitted in the third recess 13*e*. The plug body 13*b* closes the opening on one side in the axial direction of the third recess 13*e*. The plug body 13*b* covers one side in the axial direction of the motor shaft 20*a*. That is, the outer lid 13 covers one side in the axial direction of the motor shaft 20*a*. The plug body 13*b* includes a collar 13*g* protruding radially outward at an end on one side in the axial direction. The collar 13*g* contacts with the surface one side in the axial direction of the lid plate 13*c*. This allows the plug body 13*b* to be positioned in the axial direction.

Figure 4:
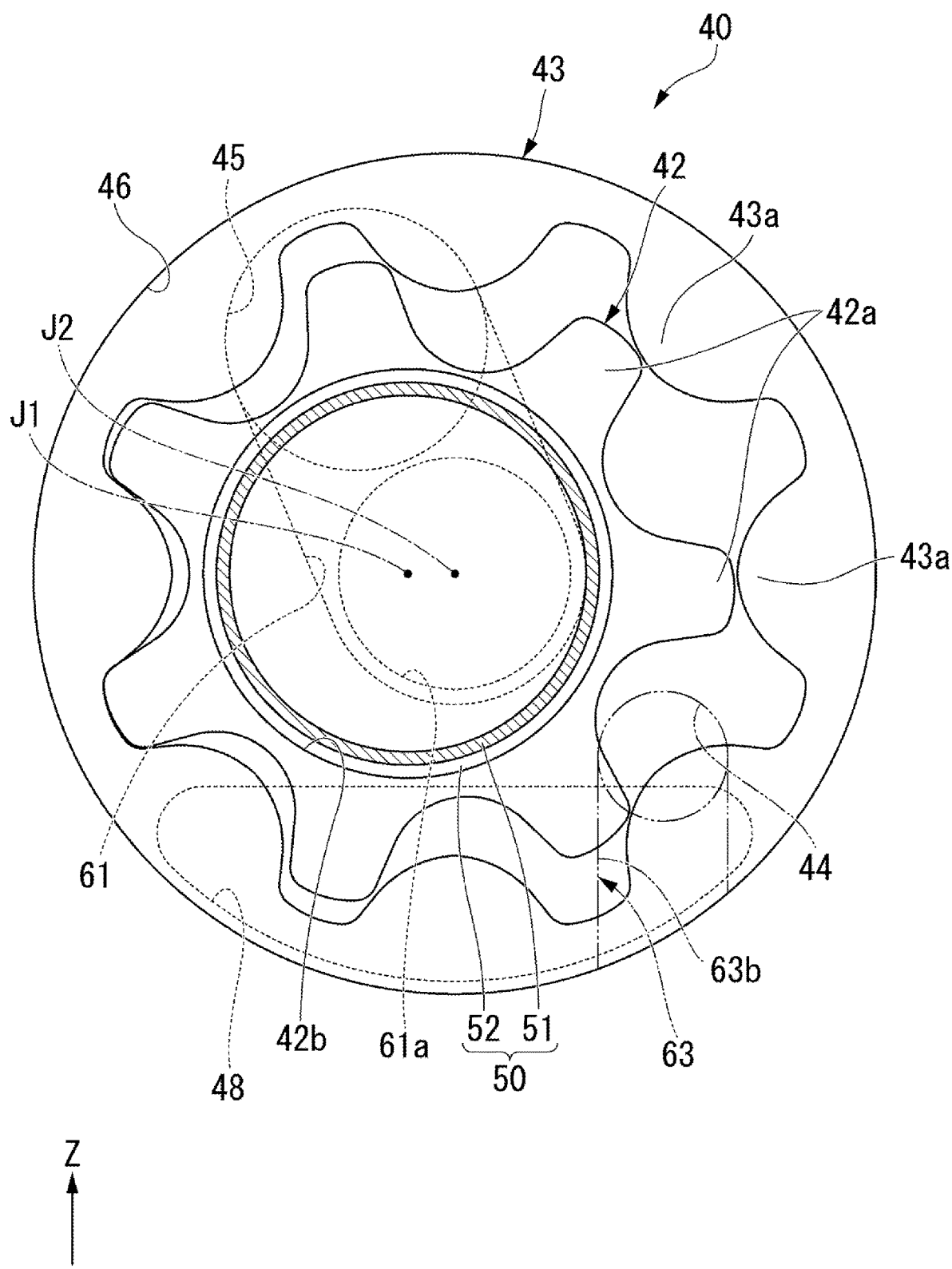
FIG. 4 is a sectional view of a drive apparatus according to a first modification of an example embodiment of the present disclosure.

A pump room 46 is provided in the outer lid 13. That is, the pump room 46 is provided in the housing 10. The pump room 46 is axially provided between the surface on the other side in the axial direction of the plug body 13*b* and the bottom surface of the third recess 13*e*. In the embodiment, the surface on the other side in the axial direction of the pump room 46 is the bottom surface of the third recess 13*e*. The surface on one side in the axial direction of the pump room 46 is the surface on the other side in the axial direction of the plug body 13*b*. The pump room 46 is the end on the other side in the axial direction in the third recess 13*e*. The pump room 46 is disposed on a radial inside of the inner tube 12*c*, namely, the inside of the second recess 12*g*. The center axis J1 passes through the pump room 46. As illustrated in FIG. 4, the outer shape of the pump room 46 is a circular shape in axial view. The pump room 46 accommodates an internal gear 43 and an external gear 42 (to be described later).

As illustrated in FIG. 1, the housing 10 has a first oil passage 61 and a suction oil passage 63. The first oil passage 61 is provided in the outer lid 13. More particularly, the first oil passage 61 is provided in the plug body 13*b*. For this reason, the configuration of the first oil passage 61 can easily be changed by exchanging the plug body 13*b*. The first oil passage 61 is disposed on one side in the axial direction of the pump room 46. The first oil passage 61 connects an upper end of the pump room 46 and the central portion of the pump room 46 on one side in the axial direction of the pump room 46. A portion of the first oil passage 61 connected to the pump room 46 is open to the surface on the other side in the axial direction of the plug body 13b.

The upper end connected to the first oil passage 61 in the pump room 46 is a discharge port 45. That is, the first oil passage 61 is connected to the discharge port 45. The central portion connected to the first oil passage 61 in the pump room 46 is a connection port 61a. As illustrated in FIG. 4, for example, the discharge port 45 and the connection port 61a have a circular shape. The discharge port 45 is disposed above the connection port 61a. The center axis J1 passes through the connection port 61a.

As illustrated in FIG. 1, the suction oil passage 63 extends upward from the opening 12f. The suction oil passage 63 is connected to the lower region in the vertical direction inside the accommodation unit 14 with the opening 12f interposed therebetween. The upper end of the suction oil passage 63 is connected to the pump room 46 on the other side in the axial direction of the pump room 46. The portion of the pump room 46 connected to the suction oil passage 63 is a suction port 44. That is, the suction oil passage 63 connects the lower region in the vertical direction in the accommodation unit 14 and the suction port 44. As illustrated in FIG. 4, for example, the suction port 44 has the circular shape. The suction port 44 is disposed below the discharge port 45 and the connection port 61a. The suction port 44 is disposed below the center axis J1.

As illustrated in FIG. 1, the suction oil passage 63 includes a first portion 63a, a second portion 63b, and a third portion 63c. The first portion 63a extends upward from the opening 12f. The upper end of the first portion 63a is located above the inner circumferential surface at the lower end of the inner tube 12c. For example, the first portion 63a is formed by closing a groove, which is recessed from the surface on the other side in the axial direction of the lid plate 13c to one side in the axial direction and extends in the vertical direction Z, by the surface on one side in the axial direction of the annular plate 12a. Consequently, the first portion 63a is axially disposed between the inner lid 12 and the outer lid 13. The opening 12f is open to the first portion 63a. Consequently, the opening 12f connects the lower region in the vertical direction in the accommodation unit 14 and the portion of the suction oil passage 63 axially disposed between the inner lid 12 and the outer lid 13.

The second portion 63b extends from the upper end of the first portion 63a toward the other side in the axial direction. The second portion 63b is formed by closing the groove recessed upward from the lower surface of the protrusion 13d toward the other side in axial direction of the recess by the inner circumferential surface of the inner tube 12c. Consequently, the second portion 63b is radially disposed between the inner lid 12 and the outer lid 13.

The third portion 63c extends upward from the end on the other side in the axial direction of the second portion 63b. The third portion 63c is provided in the protrusion 13d. The third portion 63c is disposed on the radial inside of the inner tube 12c. The third portion 63c is connected to the suction port 44. In the embodiment, at least a part of the suction oil passage 63 is axially disposed between the inner lid 12 and the outer lid 13. For this reason, at least a part of the suction oil passage 63 can be constructed with the inner lid 12 and the outer lid 13, which are fixed to each other, and the suction oil passage 63 can easily be manufactured.

A passage sectional area of the suction oil passage 63 is smaller than an opening area of the opening 12f. In other words, the opening area of the opening 12f is larger than the passage sectional area of the suction oil passage 63. The passage sectional area of the suction oil passage 63 is the area of the suction oil passage 63 in a section orthogonal to the flow direction of the oil O flowing in the suction oil passage 63. The passage sectional area of the suction oil passage 63 includes the passage sectional area of the first portion 63a, the passage sectional area of the second portion 63b, and the passage sectional area of the third portion 63c. The passage sectional area of the first portion 63a is the area of the section orthogonal to the vertical direction Z in the first portion 63a. The passage sectional area of the second portion 63b is the area of the section orthogonal to the axial direction of the second portion 63b. The passage sectional area of the third portion 63c is the area of the section orthogonal to the vertical direction Z in the third portion 63c. The opening area of the opening 12f is the area of the inside portion of the opening 12f when the opening 12f is viewed along the axial direction.

The strainer 100 is attached to the housing 10. The strainer 100 is provided in the opening 12f. As illustrated in FIGS. 2 and 3, the strainer 100 includes a frame 110 and a strainer body 120. The frame 110 has a frame shape opened to both sides in the axial direction. The frame 110 includes a fitting unit 111 and a flange 112. The fitting unit 111 has a frame shape along the inner circumferential edge of the opening 12f. The fitting unit 111 has a plate frame shape in which a plate surface is parallel to the axial direction. As illustrated in FIG. 2, the fitting unit 111 is fitted in the opening 12f from the other side in the axial direction. The end on one side in the axial direction of the fitting unit 111 is axially located at the same position as the end on one side in the axial direction of the opening 12f.

The flange 112 protrudes to the outside of the fitting unit 111 from the end on the other side in the axial direction of the fitting unit 111. As illustrated in FIG. 3, the flange 112 has a substantially rectangular frame shape. The flange 112 has a plate frame shape in which the plate surface is orthogonal to the axial direction. The flange 112 includes holes 112a at the four corners of the flange 112. The hole 112a axially penetrates the flange 112.

As illustrated in FIG. 2, a fixing screw 130 is inserted into the hole 112a from the other side in the axial direction. The fixing screw 130 is inserted into the hole 112a, and tightened in a female screw hole 12h made in the circumferential edge of the opening 12f in the annular plate 12a. Consequently, the frame 110 is fixed to the circumferential edge of the opening 12f of the inner lid 12. The surface on one side in the axial direction of the flange 112 contacts with the bottom surface of the first recess 12i, namely, the circumferential edge of the opening 12f in the surfaces on the other side in the axial direction of the annular plate 12a.

The strainer body 120 has a flat plate shape in which the plate surface is orthogonal to the axial direction. As illustrated in FIG. 3, the strainer body 120 has the rectangular shape when viewed along the axial direction. The strainer body 120 has a myriad of holes axially penetrating the strainer body 120. In the embodiment, for example, the strainer body 120 has a net shape. The myriad of holes in the strainer body 120 are smaller than the foreign matter, such as abrasion powders, which is included in the oil O. For example, the abrasion powders are generated by rubbing components of the drive device 1 during assembly or driving of the drive device 1.

The strainer body 120 is provided inside the frame 110. More particularly, in the strainer body 120, the outer edge of the strainer body 120 is fixed to the inner edge at the end on the other side in the axial direction of the fitting unit 111. The whole strainer body 120 overlaps the opening 12f when viewed along the axial direction. When viewed along the axial direction, the size of the strainer body 120 is substantially identical to the size of the opening 12f, and is slightly smaller than the size of the opening 12f. As illustrated in FIG. 2, the strainer body 120 covers the opening 12f from the other side in the axial direction. Consequently, the strainer 100 covers the opening 12f from the other side in the axial direction. In the embodiment, the strainer 100 covers the whole opening 12f. The strainer body 120 is located on the other side in the axial direction of the opening 12f.

The rotor 20 includes a motor shaft 20a, a rotor core 22, a magnet 23, a first end plate 24, and a second end plate 25. The motor shaft 20a includes a motor shaft body 21 and a mounting member 50. The motor shaft body 21 has a columnar shape extending in the axial direction. The motor shaft body 21 includes a large diameter unit 21a, a first intermediate diameter unit 21b, a second intermediate diameter unit 21c, a small diameter unit 21d, and an output unit 21e.

The large diameter unit 21a is a portion to which the rotor core 22 is attached. A male screw portion is provided on the outer circumferential surface at the end on one side in the axial direction of the large diameter unit 21a. A nut 90 is tightened to the male screw portion of the large diameter unit 21a. The first intermediate diameter unit 21b is connected to the large diameter unit 21a on one side in the axial direction of the large diameter unit 21a. An outer diameter of the first intermediate diameter unit 21b is smaller than an outer diameter of the large diameter unit 21a. The end on the other side in the axial direction of the first intermediate diameter unit 21b is journaled by the bearing 70.

The second intermediate diameter unit 21c is connected to the large diameter unit 21a on the other side in the axial direction of the large diameter unit 21a. The outer diameter of the second intermediate diameter unit 21c is smaller than the outer diameter of the large diameter unit 21a. The end on the other side in the axial direction of the second intermediate diameter unit 21c is journaled by the bearing 71. The motor shaft 20a is journaled by the bearings 70, 71. For example, the bearings 70, 71 are a ball bearing.

The small diameter unit 21d is connected to the first intermediate diameter unit 21b on one side in the axial direction of the first intermediate diameter unit 21b. The end on one side in the axial direction of the small diameter unit 21d is the end on one side in the axial direction of the motor shaft body 21. The end on one side in the axial direction of the small diameter unit 21d is disposed on the radial inside of the inner tube 12c. The outer diameter of the small diameter unit 21d is smaller than the outer diameter of the first intermediate diameter unit 21b. That is, the small diameter unit 21d is a portion where the outer diameter decreases toward one side in the axial direction.

The output unit 21e is connected to the second intermediate diameter unit 21c on the other side in the axial direction of the second intermediate diameter unit 21c. The output unit 21e is an end on the other side in the axial direction of the motor shaft body 21. The outer diameter of the output unit 21e is smaller than the outer diameter of the small diameter unit 21d. The output unit 21e axially penetrates the bottom unit 11a to protrude to the outside of the housing 10.

The motor shaft body 21 includes a flange 21f. The flange 21f protrudes radially outward from the outer circumferential surface of the large diameter unit 21a. The flange 21f has the annular plate shape that is provided over a whole circumference of the outer circumferential surface of the large diameter unit 21a. The flange 21f is provided at the end on the other side in the axial direction of the large diameter unit 21a. The motor shaft body 21 includes a hole 21g extending from the end on one side in the axial direction of the motor shaft body 21 to the other side in the axial direction. The hole 21g is a bottomed hole that is open to one side in the axial direction. That is, the end on the other side in the axial direction of the hole 21g is closed.

The mounting member 50 is fixed to one side in the axial direction of the motor shaft body 21.

The mounting member 50 is fitted in and fixed to the hole 21g. The mounting member 50 has the tubular shape that is open to both axial sides. In the embodiment, the mounting member 50 has the cylindrical shape centered on the center axis J1. The mounting member 50 extends onto one side in the axial direction with respect to the motor shaft body 21, and is inserted into the second through-hole 13f.

The mounting member 50 includes a fitting unit 51 and a fixing unit 52. The fitting unit 51 is a portion fitted in the hole 21g. The fitting unit 51 is fixed to the inner circumferential surface at the end on one side in the axial direction of the hole 21g, and extends from the inside of the hole 21g to one side in the axial direction with respect to the motor shaft body 21. The end of one side in the axial direction of the fitting unit 51 is inserted into the second through-hole 13f. That is, at least a part of the fitting unit 51 is inserted into the second through-hole 13f. For this reason, a radial gap between the outer circumferential surface of the mounting member 50 and the inner circumferential surface of the second through-hole 13f can be increased. This enables the mounting member 50 to be prevented from contacting with the inner circumferential surface of the second through-hole 13f even if the position of the mounting member 50 is radially displaced due to vibration or the like.

The fixing unit 52 is located on one side in the axial direction of the fitting unit 51. The fixing unit 52 is connected to the end on one side in the axial direction of the fitting unit 51. The outer diameter of the fixing unit 52 is larger than the outer diameter of the fitting unit 51, and is smaller than the inner diameter of the second through-hole 13f. The fixing unit 52 is inserted into the pump room 46. For example, the inner diameter of the fitting unit 51 and the inner diameter of the fixing unit 52 are identical to each other.

The external gear 42 (to be described later) is fixed to the mounting member 50. In the embodiment, the external gear 42 is fixed to the radially outside surface of the fixing unit 52. More particularly, the fixing unit 52 is fitted in and fixed to a fixing hole 42b axially penetrating the external gear 42. As described above, in the embodiment, the fitting unit 51 having the outer diameter smaller than that of the fixing unit 52 is fitted in the hole 21g, and the external gear 42 is fixed to the fixing unit 52 having the outside diameter larger than that of the fitting unit 51. For this reason, the inner diameter of the hole 21g can be made smaller than the inner diameter of the fixing hole 42b of the external gear 42. Consequently, the inner diameter of the hole 21g can easily be made relatively small, and a decrease in rigidity of the motor shaft body 21 can be prevented.

The motor shaft 20a has a second oil passage 62 provided in the motor shaft 20a. The second oil passage 62 is a bottomed hole that is recessed from the end on one side in the axial direction of the motor shaft 20a toward the other side in the axial direction. The second oil passage 62 is open to one side in the axial direction. The second oil passage 62 extends from the end on one side in the axial direction of the mounting member 50 to the end on the other side in the axial direction of the second intermediate diameter unit 21c, and is provided over the mounting member 50 and the motor shaft body 21. The second oil passage 62 is formed by axially connecting the inside of the mounting member 50 and the hole 21*g*. That is, the radially inside surface of the mounting member 50 constitutes a part of the radially inside surface of the second oil passage 62.

In the embodiment, the inner edge of the second oil passage 62 in a section orthogonal to the axial direction has the circular shape centered on the center axis J1. The inner diameter of the portion of the second oil passage 62 provided in the mounting member 50 is smaller than the inner diameter of the portion of the second oil passage 62 provided in the motor shaft body 21. That is, the inner diameter of the mounting member 50 is smaller than the inner diameter of the hole 21*g*. The opening on one side in the axial direction of the mounting member 50 is connected to the connection port 61*a*, which allows the second oil passage 62 to be connected to the first oil passage 61 through the inside of the mounting member 50. That is, the second oil passage 62 is open to the first oil passage 61 at the end on one side in the axial direction of the motor shaft 20*a*.

Figure 5:
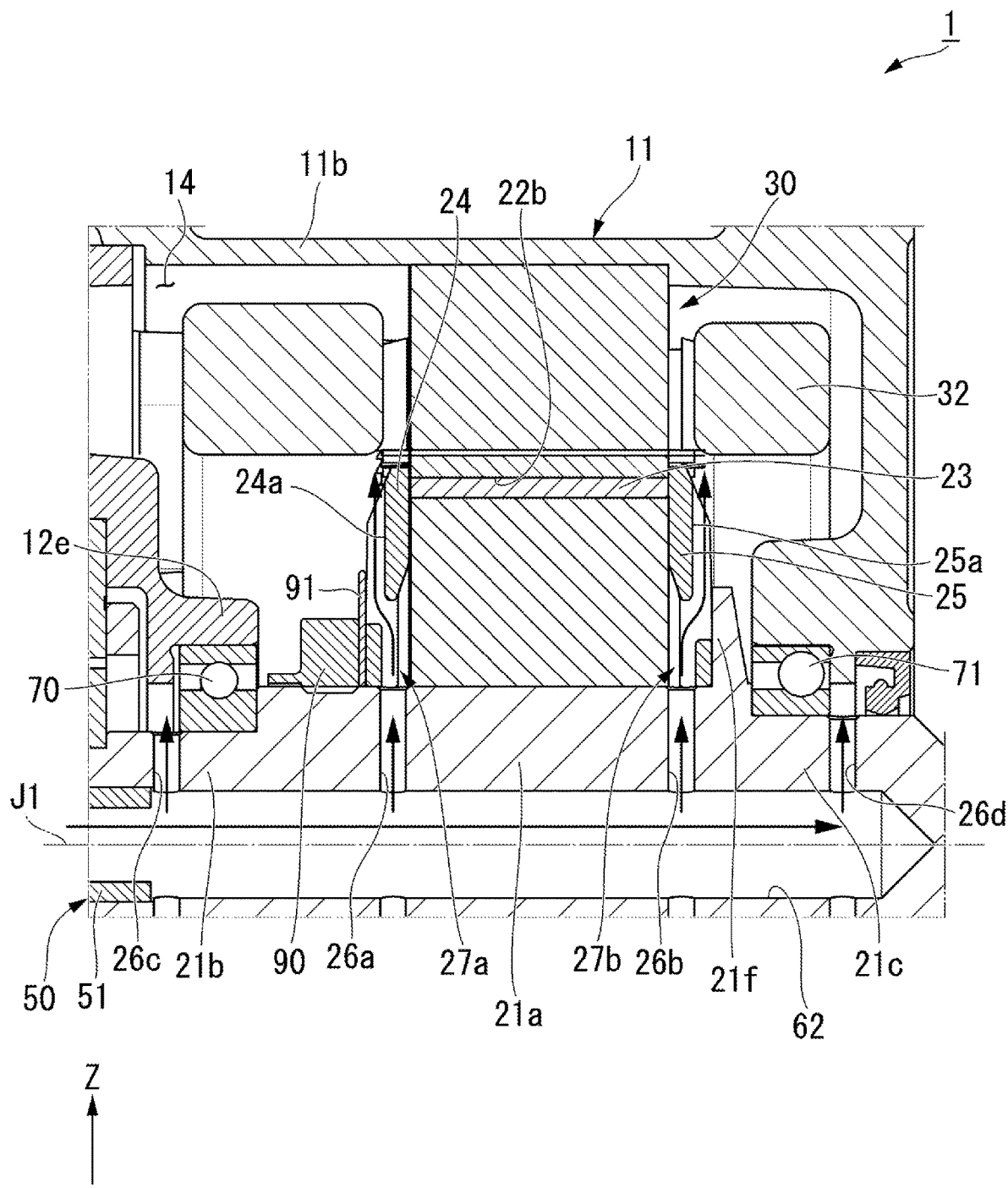
FIG. 5 is a side view of a vehicle on which the drive apparatus according to the first modification is installed.

The motor shaft 20*a* includes first through-holes 26*a* to 26*d* connecting the second oil passage 62 and the outer circumferential surface of the motor shaft 20*a*. The first through-holes 26*a* to 26*d* extend in the radial direction. The first through-holes 26*a*, 26*b* are made in the large diameter unit 21*a*. The first through-holes 26*a*, 26*b* are axially disposed between the nut 90 and the flange 21*f*. As illustrated in FIG. 5, the radially outside end of the first through-hole 26*a* is open to the axial gap 27*a* between the first end plate 24 and the rotor core 22. The radially outside end of the first through-hole 26*b* is open to an axial gap 27*b* between the second end plate 25 and the rotor core 22.

The first through-hole 26*c* is made in the first intermediate diameter unit 21*b*. The radially outside end of the first through-hole 26*c* is open to the radial inside of the bearing holder 12*e* on one side in the axial direction of the bearing 70. The first through-hole 26*d* is made in the second intermediate diameter unit 21*c*. The radially outside end of the first through-hole 26*d* is open to the radial inside of the bearing holder 11*c* on the other side in the axial direction of the bearing 71. For example, a plurality of the first through-holes 26*a* to 26*d* is made along the circumferential direction.

As illustrated in FIG. 1, the rotor core 22 has the annular shape fixed to the motor shaft body 21. In the embodiment, the rotor core 22 is fitted in the large diameter unit 21*a*. The rotor core 22 includes a magnet insertion hole 22*b* axially penetrating the rotor core 22. A plurality of magnet insertion holes 22*b* is provided along the circumferential direction. The magnet 23 is inserted into the magnet insertion hole 22*b*.

The first end plate 24 and the second end plate 25 have the annular plate shape expanding in the radial direction. The large diameter unit 21*a* is inserted into the first end plate 24 and the second end plate 25. The first end plate 24 and the second end plate 25 axially sandwich the rotor core 22 while contacting with the rotor core 22.

As illustrated in FIG. 5, the first end plate 24 is disposed on one side in the axial direction of the rotor core 22. The radially outer edge of the first end plate 24 protrudes to the other side in the axial direction, and contacts with the radially outer edge in the surface on one side in the axial direction of the rotor core 22. The outer edge in the radial direction of the first end plate 24 axially overlaps the opening on one side in the axial direction of the magnet insertion hole 22*b*, and presses the magnet 23 inserted into the magnet insertion hole 22*b* from one side in the axial direction. A radially inside portion with respect to the outer edge in the radial direction of the first end plate 24 is axially opposed to the surface on one side in the axial direction of the rotor core 22 with a gap 27*a* interposed therebetween.

The first end plate 24 includes an exhaust groove 24*a* recessed from the surface on one side in the axial direction of the first end plate 24 toward the other side in the axial direction. The exhaust groove 24*a* extends in the radial direction. The radially inside end of the exhaust groove 24*a* axially penetrates the first end plate 24, and is connected to the gap 27*a*. The radially outside end of the exhaust groove 24*a* is open to the radial outside of the first end plate 24, and is radially opposed to the coil 32 (to be described later) with a gap interposed therebetween. The opening on one side in the axial direction in the portion on the radial inside of the exhaust groove 24*a* is closed by a washer 91 that is fixed while axially sandwiched between the nut 90 and the first end plate 24. The washer 91 has the annular plate shape expanding in the radial direction.

The second end plate 25 is disposed on the other side in the axial direction of the rotor core 22. The radially outer edge of the second end plate 25 protrudes to one side in the axial direction, and contacts with the radially outer edge in the surface on the other side in the axial direction of the rotor core 22. The outer edge in the radial direction of the second end plate 25 axially overlaps the opening on the other side in the axial direction of the magnet insertion hole 22*b*, and presses the magnet 23 inserted into the magnet insertion hole 22*b* from the other side in the axial direction. Consequently, both sides in the axial direction of the magnet 23 inserted into the magnet insertion hole 22*b* are pressed by the first end plate 24 and the second end plate 25. Thus, the magnet 23 can be prevented from coming out of the magnet insertion hole 22*b*.

A radially inside portion with respect to the outer edge in the radial direction of the second end plate 25 is axially opposed to the surface on the other side in the axial direction of the rotor core 22 with a gap 27*b* interposed therebetween. The second end plate 25 includes exhaust grooves 25*a* recessed from the surface on the other side in the axial direction of the second end plate 25 toward one side in the axial direction. The exhaust groove 25*a* extends in the radial direction. The radially inside end of the exhaust groove 25*a* axially penetrates the second end plate 25, and is connected to the gap 27*b*. The radially outside end of the exhaust groove 25*a* is open to the radial outside of the second end plate 25, and is radially opposed to the coil 32 (to be described later) with a gap interposed therebetween. The opening on the other side in the axial direction in the radial inside portion of the exhaust groove 25*a* is closed by the flange 21*f*.

The first end plate 24, the rotor core 22, and the second end plate 25 are axially sandwiched between the nut 90 and the washer 91 and the flange 21*f*. The nut 90 is tightened into the male screw portion of the large diameter unit 21*a*, which allows the nut 90 to press the first end plate 24, the rotor core 22, and the second end plate 25 against the flange 21*f* with the washer 91 interposed therebetween. Consequently, the first end plate 24, the rotor core 22, and the second end plate 25 are fixed to the motor shaft 20*a*.

The rotation detector 80 in FIG. 1 detects rotation of the rotor 20. In the embodiment, for example, the rotation detector 80 is a Variable Reluctance (VR) type resolver. The rotation detector 80 is disposed on the radial inside of the inner tube 12*c*. The rotation detector 80 includes a detection target unit 81 and a sensor 82.

The detection target unit 81 has an annular shape extending in the circumferential direction. The detection target unit 81 is fitted in and fixed to the motor shaft 20a. More particularly, the detection target unit 81 is fitted in and fixed to the small diameter unit 21d. The surface on the other side in the axial direction at the radially inner edge of the detection target unit 81 contacts with a step between the first intermediate diameter unit 21b and the small diameter unit 21d. The detection target unit 81 radially overlaps the mounting member 50. For this reason, the motor shaft 20a can be easily downsized in the axial direction as compared with the case that the detection target unit 81 and the mounting member 50 are axially disposed at an interval while not radially overlapping each other. The detection target unit 81 is made of a magnetic material.

As used herein, "certain objects overlap each other in a certain direction" includes the case that certain objects overlap each other when viewed along a certain direction. That is, the term "the detection target unit 81 radially overlaps the mounting member 50" includes the overlap of the detection target unit 81 and the mounting member 50 when viewed along the radial direction.

The sensor 82 is axially disposed between the inner lid 12 and the outer lid 13. More particularly, the sensor 82 is fixed to the surface on one side in the axial direction of the inner tube bottom unit 12d on the radial inside of the inner tube 12c. That is, the sensor 82 is attached to the inner lid 12. For this reason, the sensor 82 is easy to be attached. The sensor 82 is disposed in the second recess 12g. For this reason, after the inner lid 12 is attached to the main body 11, the sensor 82 can be disposed by inserting the sensor 82 into the second recess 12g from the opening on one side in the axial direction of the second recess 12g. Thus, the sensor 82 is easy to be disposed.

The sensor 82 has the annular shape surrounding the radial outside of the detection target unit 81. The sensor 82 includes a plurality of coils along the circumferential direction. When the detection target unit 81 rotates together with the motor shaft 20a, an induced voltage corresponding to the circumferential position of the detection target unit 81 is generated in the coil of the sensor 82. The sensor 82 detects the rotation of the detection target unit 81 by detecting the induced voltage. Consequently, the rotation detector 80 detects the rotation of the motor shaft 20a, and detects the rotation of the rotor 20.

The stator 30 is radially opposed to the rotor 20 with the gap interposed therebetween. The stator 30 includes the stator core 31 and the plurality of coils 32 mounted on the stator core 31. The stator core 31 has the annular shape centered on the center axis J1. The outer circumferential surface of the stator core 31 is fixed to the inner circumferential surface of the main body tube 11b. The stator core 31 is opposed to the radial outside of the rotor core 22 with the gap interposed therebetween.

The pump 40 is provided in the central portion of the outer lid 13. The pump 40 is disposed on one side in the axial direction of the motor shaft 20a. The pump 40 includes the external gear 42, the internal gear 43, the pump room 46 described above, a suction port 44, a discharge port 45, and a storage unit 48. The external gear 42 is a gear that is rotatable about the center axis J1. The external gear 42 is fixed to one end in the axial direction of the motor shaft 20a. More particularly, the external gear 42 is fixed to the outer circumferential surface of the fixing unit 52. For this reason, the external gear 42 can be fixed to the motor shaft body 21 with the mounting member 50 interposed therebetween. Consequently, by adjusting the size of the mounting member 50, the external gear 42 can be fixed to the motor shaft body 21 without changing the sizes of the motor shaft body 21 and the external gear 42.

The external gear 42 is accommodated in the pump room 46. As illustrated in FIG. 4, the external gear 42 includes a plurality of teeth 42a on the outer circumferential surface of the external gear 42. A tooth shape of the tooth 42a of the external gear 42 is a trochoidal tooth shape.

The internal gear 43 is an annular gear which is rotatable about a rotation axis J2 eccentric to the center axis J1. The internal gear 43 is accommodated in the pump room 46. The internal gear 43 surrounds the radial outside of the external gear 42, and meshes with the external gear 42. The internal gear has a plurality of teeth 43a on the inner circumferential surface of the internal gear 43. The tooth shape of the tooth 43a of the internal gear 43 is the trochoidal tooth shape. In this way, the tooth 42a of the external gear 42 and the tooth 43a of the internal gear 43 have the trochoidal tooth shape, so that a trochoid pump can be constructed. Thus, noise generated from the pump 40 can be reduced, and pressure and an amount of oil O discharged from the pump 40 can easily be stabilized.

In the embodiment, after the internal gear 43 and the external gear 42 are inserted from the opening on one side in the axial direction of the third recess 13e, the opening on one side in the axial direction of the third recess 13e is closed by the plug body 13b, which allows the internal gear 43 and the external gear 42 to be accommodated in the pump room 46 while the pump room 46 is formed. This enables the pump 40 to be easily assembled.

As described above, the suction port 44 is connected to the suction oil passage 63. As illustrated in FIG. 1, the suction port 44 is open to the other side in the axial direction of the pump room 46. The suction port 44 is connected to the gap between the external gear 42 and the internal gear 43. The suction port 44 allows the oil O stored in the accommodation unit 14 to be sucked into the pump room 46, more particularly, the gap between the external gear 42 and the internal gear 43 through the strainer 100, the opening 12f, and the suction oil passage 63. As illustrated in FIG. 4, the suction port 44 is disposed above the lower end of the storage unit 48 and above the lower end of the external gear 42.

As described above, the discharge port 45 is connected to the first oil passage 61. As illustrated in FIG. 1, the discharge port 45 is open to one side in the axial direction of the pump room 46. The discharge port 45 is connected to the gap between the external gear 42 and the internal gear 43. The discharge port 45 allows the oil O to be discharged from the pump room 46, more particularly, the gap between the external gear 42 and the internal gear 43.

The storage unit 48 is connected to the pump room 46 on one side in the axial direction of the lower region in the vertical direction of the pump room 46. As illustrated in FIG. 4, the storage unit 48 has the bow shape protruding downward in axial view. A part of the oil O sucked from the suction port 44 into the pump room 46 flows into the storage unit 48.

Because the suction port 44 is disposed above the lower end of the storage unit 48, even if the pump 40 stops, at least a part of the oil O flowing into the storage unit 48 is stored in the storage unit 48 without returning from the suction port 44 to the accommodation unit 14. Consequently, when the pump 40 stops, the lower portions of the external gear 42 and the internal gear 43 in the pump room 46 can contact with the oil O in the storage unit 48. Thus, when the pump 40 is driven again, the oil O can be interposed between the tooth 42a of the external gear 42 and the tooth 43a of the internal gear 43 and between the inner circumferential surface of the pump room 46 and the outer circumferential surface of the internal gear 43, and generation of seizure can be prevented.

When the rotor 20 rotates to rotate the motor shaft 20a, the external gear 42 fixed to the motor shaft 20a rotates. Consequently, the internal gear 43 meshing with the external gear 42 rotates to send the oil O sucked from the suction port 44 into the pump room 46 to the discharge port 45 through between the external gear 42 and the internal gear 43. In this way, the pump 40 is driven through the motor shaft 20a. The oil O discharged from the discharge port 45 flows into the first oil passage 61, and flows from the connection port 61a to the second oil passage 62. As indicated by an arrow in FIG. 5, the oil O flowing into the second oil passage 62 receives radially outside force due to centrifugal force of the rotating motor shaft 20a, and flows to the outside of the motor shaft 20a through the first through-holes 26a to 26d.

In the embodiment, because the first through-hole 26a is open in the axial gap 27a between the first end plate 24 and the rotor core 22, the oil O flowing out from the first through-hole 26a flows into the gap 27a. The oil O flowing into the gap 27a is exhausted radially outward from the exhaust groove 24a. In the embodiment, because the opening on one side in the axial direction of the radially inside portion of the exhaust groove 24a is closed by the washer 91, the oil O flowing into the exhaust groove 24a is easily guided radially outward by the washer 91.

Because the first through-hole 26b is open to the axial gap 27b between the second end plate 25 and the rotor core 22, the oil O flowing out from the first through-hole 26b flows into the gap 27b. The oil O flowing into the gap 27b is exhausted radially outward from the exhaust groove 25a. In the embodiment, because the opening on the other side in the axial direction in the radially inside portion of the exhaust groove 25a is closed by the flange 21f, the oil O flowing into the exhaust groove 25a is easily guided radially outward by the flange 21f.

The oil O exhausted radially outward from the exhaust grooves 24a, 25a is blown onto the coil 32. This enables the oil O to cool the coil 32. In the embodiment, the second oil passage 62 is provided in the motor shaft 20a, so that the rotor 20 can also be cooled by the oil O until the oil O is exhausted from the exhaust grooves 24a, 25a. As described above, in the present embodiment, the oil O discharged from the discharge port 45 is guided to the rotor 20 and the stator 30.

Because the first through-hole 26c is open to the radial inside of the bearing holder 12e, the oil O flowing out from the first through-hole 26c is supplied to the bearing 70. Because the first through-hole 26d is open to the radial inside of the bearing holder 11c, the oil O flowing out from the first through-hole 26d is supplied to the bearing 71. Consequently, the oil O can be used as a lubricant for the bearings 70, 71.

FIG. 5 illustrates an example in which the oil O is exhausted upward from the exhaust grooves 24a, 25a. However, the present disclosure is not limited to this configuration. Because the rotor 20 rotates, the circumferential positions of the exhaust grooves 24a and 25a change in association with the rotation of the rotor 20. Consequently, the direction of the oil O exhausted from the exhaust grooves 24a, 25a changes to the circumferential direction, and the plurality of coils 32 arranged along the circumferential direction can be cooled by the oil O.

As described above, the pump 40 can be driven by the rotation of the motor shaft 20a, and the oil O stored in the housing 10 can be sucked up by the pump 40, and supplied to the rotor 20, the stator 30, and the bearings 70, 71. Consequently, the rotor 20 and the stator 30 can be cooled using the oil O stored in the housing 10, and lubricity between the bearings 70, 71 and the motor shaft body 21 can be improved. The oil O supplied to the stator 30 and the bearings 70, 71 drops in the accommodation unit 14, and is stored in the lower region in the accommodation unit 14 again. This allows circulation of the oil O in the accommodation unit 14.

In the embodiment, because the strainer 100 is provided in the opening 12f, the oil O flowing from the opening 12f into the suction oil passage 63 passes through the strainer 100. Specifically, the oil O flowing into the suction oil passage 63 passes through a myriad of holes of the strainer body 120. On the other hand, the foreign matter, such as abrasion powders, which is included in the oil O hardly passes through the myriad of holes, and is easily blocked by the strainer body 120. Consequently, even if the foreign matter such as abrasion powders is included in the oil O, the foreign matter can be blocked by the strainer 100, and the foreign matter can be prevented from invading into the suction oil passage 63 connected to the suction port 44 of the pump 40. Thus, the drive device 1 that can prevent the invasion of the foreign matter into the pump 40 is obtained in the embodiment. Consequently, for example, biting of the foreign matter between the external gear 42 and the internal gear 43 can be prevented, and the external gear 42 can be prevented from not rotating relative to the internal gear 43. Thus, the pump 40 can be prevented from being locked.

In the embodiment, because the myriad of holes of the strainer body 120 are smaller than the foreign matter, the foreign matter cannot pass through the myriad of holes of the strainer body 120. This allows the foreign matter to be prevented from invading into the pump 40.

For example, in the case that the inner lid and the outer lid are a part of a lid member that is a single member, a method for making a hole along the suction oil passage by performing hole drilling on the lid member is conceivable as a method for making the suction oil passage. However, in the case that the suction oil passage is bent while the method is adopted, the suction oil passage is hardly formed by one-time hole drilling. For this reason, the hole drilling is performed on each linear passage portion extending linearly in the suction oil passage, and the suction flow passage is formed by performing the hole drilling a plurality of times. At this point, in forming the linear flow passage portion, an unnecessary hole portion that does not constitute the linear passage portion tends to be formed, for example, because the hole drilling tends to be necessary to make a hole penetrating the lid member in the direction in which the linear passage portion extends. Thus, it is necessary to close the unnecessary hole portion using a plug or the like.

In the case that the suction oil passage is formed in the lid member that is the single member as described above, for example, in consideration of the opening area of the opening that is open to the inside of the accommodation unit, it is necessary to close a portion of the through-hole opposite to the opening using the plug or the like after the large through-hole penetrating the lid member is made by hole drilling. However, in this case, because of the large through-hole, it is difficult to close the through-hole with high accuracy. Thus, in the lid member that is the single member, sometimes it is difficult to enlarge the opening area of the opening of the suction oil passage.

In the case that the opening has the relatively small opening area, the area of the strainer body through which the oil O passes is also reduced. For this reason, a problem that clogging is easily generated by the foreign matter arises when the foreign matter is blocked to some extent by the strainer body. When the strainer is clogged, the oil O hardly passes through the strainer, so that the oil O is hardly supplied to the pump.

On the other hand, in the embodiment, the inner lid 12 and the outer lid 13 are the separate member, and the opening 12f connects the inside of the accommodation unit 14 and the portion of the suction oil passage 63 disposed between the inner lid 12 and the outer lid 13. For this reason, the whole through-hole made by the hole drilling to penetrate the inner lid 12 can constitute the opening 12f. That is, the unnecessary hole portion is not generated even if the hole drilling to penetrate the inner lid 12 is performed. Thus, it is not necessary to close a part of the through-hole made by the hole drilling, but it is easy to enlarge the opening area of the opening 12f. For this reason, the opening 12f can be enlarged to increase the portion that blocks the foreign matter in the strainer 100 provided in the opening 12f, namely, the strainer body 120. This enables the strainer 100 to be prevented from being clogged due to the foreign matter. Thus, in the embodiment, the oil O can easily be supplied to the pump 40 while the foreign matter is prevented from invading into the pump 40.

In the embodiment, the opening area of the opening 12f is larger than the passage sectional area of the suction oil passage 63. For this reason, the opening 12f can be made relatively large, and the strainer 100 provided in the opening 12f can be made relatively large. Thus, the clogging of the strainer 100 can further be prevented.

In the embodiment, the strainer 100 covers the whole opening 12f. For this reason, all of the oil O flowing from the opening 12f into the suction oil passage 63 passes through the strainer 100. This enables the strainer 100 to further block the foreign matter to further prevent the foreign matter from invading into the pump 40.

In the embodiment, the strainer 100 covers the opening 12f from the other side in the axial direction. That is, the strainer 100 covers the opening 12f from the side opposite to the side on which the outer lid 13 is disposed with respect to the inner lid 12. For this reason, for example, even if the strainer 100 is large in the axial direction, the strainer 100 can be disposed in the accommodation unit 14. Because the inside of the accommodation unit 14 can be used as the space where the strainer 100 is disposed, the necessity to change the shape of the housing 10 hardly arises to prevent the enlargement of the drive device 1 even in the case of changing the shape of the strainer 100.

The strainer 100 is prevented from being disposed in the suction oil passage 63, so that the strainer 100 can be prevented from interfering with a flow of the oil O in the suction oil passage 63. Specifically, in the embodiment, because the flange 112 is not disposed in the suction oil passage 63, the oil O does not collide with the flange 112 in the suction oil passage 63, but the flow of the oil O can be prevented from being confused in the suction oil passage 63. Thus, energy efficiency of the pump 40 can be improved.

The strainer 100 can be disposed in the accommodation unit 14 in which the oil O is stored, so that the foreign matter in the oil O can be blocked by the strainer 100 at a position closer to the accommodation unit 14, namely, at a position further away from the suction oil passage 63. Thus, the foreign matter is easily prevented from invading into the pump 40.

In the embodiment, the opening 12f is provided in the bottom surface of the first recess 12i. For this reason, the foreign matter is easily kept in the first recess 12i even if the foreign matter blocked by the strainer 100 is peeled off from the strainer 100. This enables the foreign matter in the oil O to be easily accumulated in the first recess 12i. Thus, movement of the foreign matter can be prevented in the accommodation unit 14, and, for example, the foreign matter can be prevented from moving to the bearings 70, 71. Consequently, the foreign matter can be prevented from invading between an inner ring and an outer ring of the bearings 70, 71, and the inner ring of the bearings 70, 71 can be prevented from not rotating relative to the outer ring.

In the case that the strainer 100 is disposed in the accommodation unit 14 as described above, the inside of the first recess 12i can be used as the space where the strainer 100 is disposed, and the strainer 100 is easily disposed.

In the embodiment, the strainer body 120 has the flat plate shape. For this reason, the space where the strainer 100 is disposed can be reduced, and the strainer 100 is easily disposed. The strainer 100 is easily attached to the opening 12f.

In the embodiment, the oil O discharged from the discharge port 45 can be sent to the inside of the motor shaft 20a by providing the first oil passage 61 and the second oil passage 62. The first through-holes 26a to 26d are made, so that the oil O flowing into the second oil passage 62 can be supplied to the stator 30 and the bearings 70, 71.

In the embodiment, the second oil passage 62 provided in the motor shaft 20a is open to the first oil passage 61 connected to the discharge port 45 at the end on one side in the axial direction of the motor shaft 20a. Because the external gear 42 is fixed to the end on one side in the axial direction of the motor shaft 20a, the end on one side in the axial direction of the motor shaft 20a is disposed at a position relatively close to the discharge port 45. Thus, the first oil passage 61 connecting the discharge port 45 and the second oil passage 62 can be shortened. For this reason, in the embodiment, a total length of the oil passage from the opening 12f to the second oil passage 62 is easily shortened. Consequently, the oil O is easily sent to the second oil passage 62 provided in the motor shaft 20a. The structure of the drive device 1 is easily simplified, and the manufacturing of the drive device 1 can be facilitated.

In the embodiment, the radially inside surface of the mounting member 50 constitutes a part of the radially inside surface of the second oil passage 62. For this reason, the oil O can flow from the mounting member 50 into the second oil passage 62 while the external gear 42 is fixed to the mounting member 50. Consequently, as described above, the motor shaft body 21 and the external gear 42 can be fixed with the mounting member 50 interposed therebetween without changing the sizes of the motor shaft body 21 and the external gear 42, and the second oil passage 62 is easily open to the first oil passage 61.

The present disclosure is not limited to the above embodiment, but other configurations may be adopted.

The strainer 100 is not particularly limited as long as the strainer 100 is provided in the opening 12f. For example, the strainer 100 may have the cylindrical shape. The strainer 100 may cover the opening 12f from one side in the axial direction. The strainer 100 may cover only a part of the opening 12f. The strainer body 120 may not have a net shape as long as the strainer body 120 has the myriad of holes. The opening 12f may penetrate the inner lid 12 in any direction as long as the opening 12f penetrates the inner lid 12. For example, the opening 12f may penetrate the inner lid 12 in the vertical direction Z, or penetrate the inner lid 12 in the radial direction. The pump room 46 may be provided in the inner lid 12.

The external gear 42 may directly be fixed to the motor shaft body 21 with no use of the mounting member 50. In this case, for example, the second oil passage 62 may be provided only in the motor shaft body 21. The mounting member 50 may be fixed to the outer circumferential surface of the motor shaft body 21.

The mounting member 50 may be a member having a uniform outer diameter over the whole axial direction. That is, the outer diameter of the fitting unit 51 and the outer diameter of the fixing unit 52 may be identical to each other. In this case, for example, when the outer diameter of the fixing unit 52 is reduced to be equal to the outer diameter of the fitting unit 51 in FIG. 1, the outer diameter of the external gear 42 to which the fixing unit 52 is fixed can be decreased. Consequently, the outer diameter of the internal gear 43 can be decreased, and the inner diameter of the pump room 46 can be decreased. Thus, the outer diameter of the protrusion 13d in which the pump room 46 is provided can be decreased, and a radial gap between the radially outside surface of the protrusion 13d and the inner circumferential surface of the second recess 12g can be increased. For this reason, for example, a portion of the sensor 82 protruding to one side in the axial direction can be disposed between the radially outside surface of the protrusion 13d and the inner circumferential surface of the second recess 12g, and the sensor 82 can be brought closer to the outer lid 13. Consequently, the whole drive device 1 is easily downsized in the axial direction. For example, the portion of the sensor 82 protruding to one side in the axial direction is the coil of the sensor 82.

The mounting member 50 may be constructed with at least two members. In this case, the mounting member 50 may include a first tubular member fitted in the hole 21g, a second tubular member that is fitted in the first tubular member and extends to one side in the axial direction with respect to the motor shaft body 21. In this case, the external gear 42 is fixed to the end on one side in the axial direction of the second tubular member.

In the embodiment, the portion of the mounting member 50 that is inserted into the second through-hole 13f is a fitting unit 51 having the outer diameter smaller than that of the fixing unit 52. For this reason, a configuration in which the inner diameter of the second through-hole 13f is made smaller than the outer diameter of the fixing unit 52 and the radial gap between the outer circumferential surface of the mounting member 50 and the inner circumferential surface of the second through-hole 13f is made relatively small can also be adopted. Consequently, the oil O in the pump room 46 can be prevented from leaking through the second through-hole 13f. In the case that this configuration is adopted, an assembling worker inserts the fitting unit 51 into the second through-hole 13f from the opening on the left side of the third recess 13e after attaching the outer lid 13 to the inner lid 12, and the mounting member 50 is fixed to the motor shaft body 21 by fitting the fitting unit 51 in the hole 21g of the motor shaft body 21.

When the second through-hole 13f can be made smaller, the radially inner end of the closing unit that closes the opening on the other side in the axial direction of the pump room 46 can further be disposed radially inward. In the embodiment, the closing unit that closes the opening on the other side in the axial direction of the pump room 46 is a radially outside portion of the second through-hole 13f in the protrusion 13d. The radially inside end of the closing unit can further be disposed radially inward, so that the opening on the other side in the axial direction of the pump room 46 can suitably be closed by the closing unit even if the outer diameter of the external gear 42 and the outer diameter of the internal gear 43 are made smaller. For this reason, the inner diameter of the pump room 46 can be decreased. Thus, as described above, a part of the sensor 82 can radially be disposed between the radially outside surface of the protrusion 13d and the inner circumferential surface of the second recess 12g, and therefore the drive device 1 is easily downsized in the axial direction.

The rotor core 22 may be fixed to the outer circumferential surface of the motor shaft body 21 by press fitting or the like. In this case, the first end plate 24 and the second end plate 25 may not be provided. In this case, the oil O flowing out from the first through-holes 26a, 26b may directly be supplied to the coil 32, or a hole connected to the first through-hole 26a may be provided in the rotor core 22 to supply the oil O to the coil 32 through the hole of the rotor core 22. The oil O may be supplied to the stator core 31.

A place to which the oil O discharged from the discharge port 45 is supplied is not particularly limited, and the oil O may be supplied to only one or two of the rotor 20, the stator 30, and the bearings 70, 71, or may not be supplied to any. For example, the oil O discharged from the discharge port 45 may be supplied to the inside surface of the upper region in the vertical direction of the accommodation unit 14. In this case, the stator 30 can indirectly be cooled by cooling the housing 10. At least one of the first through-holes 26a to 26d may not be made. The tooth 42a of the external gear 42 and the tooth 43a of the internal gear 43 may have a cycloid tooth shape or an involute tooth shape.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A drive device comprising:
   a rotor including a motor shaft disposed along a center axis extending in one direction and a rotor core fixed to the motor shaft;
   a stator radially opposed the rotor with a gap interposed between the stator and the rotor;
   a housing including an accommodation portion to store oil and accommodate the rotor and the stator;
   a pump driven through the motor shaft; and
   a strainer attached to the housing; wherein
   the pump includes:
      a pump room provided in the housing;
      a suction port through which the oil is to be sucked into the pump room; and
      a discharge port through which the oil is to be discharged from the pump room;
   the housing includes:
      an inner lid that holds a bearing journaling the motor shaft and covers one side in an axial direction of the stator;
      an outer lid that is attached to one side in the axial direction of the inner lid and covers one side in the axial direction of the motor shaft; and a suction oil passage connecting a lower region in a vertical direction in the accommodation portion and the suction port;

the inner lid and the outer lid are separate structural elements;

at least a portion of the suction oil passage is disposed between the inner lid and the outer lid;

the inner lid includes an opening penetrating the inner lid;

the opening connects the lower region in the vertical direction in the accommodation portion and a portion disposed between the inner lid and the outer lid in the suction oil passage; and the strainer is provided in the opening.

2. The drive device according to claim 1, wherein an opening area of the opening is larger than a passage sectional area of the suction oil passage.

3. The drive device according to claim 1, wherein the strainer covers an entirety of the opening.

4. The drive device according to claim 1, wherein the opening axially penetrates the inner lid and connects the lower region in the vertical direction in the accommodation unit and the portion axially disposed between the inner lid and the outer lid in the suction oil passage; and the strainer covers the opening from the other side in the axial direction.

5. The drive device according to claim 1, wherein the inner lid includes a first recess recessed from the other side in the axial direction toward one side in the axial direction; and the opening is provided on a bottom surface of the first recess.

6. The drive device according to claim 1, wherein the strainer includes:

a frame-shaped frame fixed to a circumferential edge of the opening in the inner lid; and a flat plate-shaped strainer body that is provided inside the frame and covers the opening.

* * * * *